(12) United States Patent
Sap

(10) Patent No.: US 9,676,242 B2
(45) Date of Patent: Jun. 13, 2017

(54) REAR LINK CONTROL

(71) Applicant: AGCO SA, Hesston, KS (US)

(72) Inventor: Bruno Sap, Haute Epine (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 15/108,382

(22) PCT Filed: Dec. 17, 2014

(86) PCT No.: PCT/EP2014/078310
§ 371 (c)(1),
(2) Date: Jun. 27, 2016

(87) PCT Pub. No.: WO2015/101503
PCT Pub. Date: Jul. 9, 2015

(65) Prior Publication Data
US 2016/0325594 A1    Nov. 10, 2016

(30) Foreign Application Priority Data

Dec. 31, 2013   (GB) .................................. 1323179.0

(51) Int. Cl.
*B60G 9/00*       (2006.01)
*A01B 59/06*      (2006.01)
*A01B 63/114*     (2006.01)

(52) U.S. Cl.
CPC .............. *B60G 9/00* (2013.01); *A01B 59/068* (2013.01); *A01B 63/114* (2013.01); *B60G 2200/30* (2013.01); *B60G 2204/421* (2013.01); *B60G 2204/422* (2013.01); *B60G 2300/08* (2013.01); *B60G 2300/082* (2013.01)

(58) Field of Classification Search
CPC .... B60G 9/00; B60G 2204/421; A01B 63/114
See application file for complete search history.

(56) References Cited

U.S. PATENT DOCUMENTS

| 4,428,435 A * | 1/1984 | Hubbard ................ A01B 63/22 |
| | | 172/328 |
| 4,508,178 A * | 4/1985 | Cowell ................ A01B 63/114 |
| | | 172/239 |
| 5,320,186 A * | 6/1994 | Strosser ............... A01B 63/112 |
| | | 172/7 |
| 5,538,264 A | 7/1996 | Brown et al. |
| 6,491,129 B1 * | 12/2002 | Young ..................... B60G 3/20 |
| | | 172/439 |

(Continued)

FOREIGN PATENT DOCUMENTS

| DE | 3024651 A1 | 1/1982 |
| EP | 1623854 A1 | 2/2006 |
| GB | 847555 A | 9/1960 |

OTHER PUBLICATIONS

UK Intellectual Property Office, International Search Report for Priority Application No. GB1323179.0, dated Aug. 6, 2014.

(Continued)

*Primary Examiner* — Drew Brown

(57) ABSTRACT

A suspended axle for a tractor, the axle having a lower link mechanism selectively operable between a first configuration in which the lower links are in fixed relation to the suspended axle and a second configuration in which the lower links are isolated from the suspended axle.

6 Claims, 2 Drawing Sheets

(56) References Cited

U.S. PATENT DOCUMENTS

| | | | |
|---|---|---|---|
| 7,207,575 B2* | 4/2007 | Bordini | B60G 3/12 |
| | | | 180/363 |
| 2004/0145097 A1 | 7/2004 | Renaudot | |
| 2006/0027992 A1 | 2/2006 | Bordini | |
| 2012/0298431 A1 | 11/2012 | Husson et al. | |
| 2016/0029543 A1* | 2/2016 | Stich | A01B 59/043 |
| | | | 701/50 |

OTHER PUBLICATIONS

European Patent Office, International Search Report for International Patent No. PCT/EP2014/078310, mail date Feb. 17, 2015.

* cited by examiner

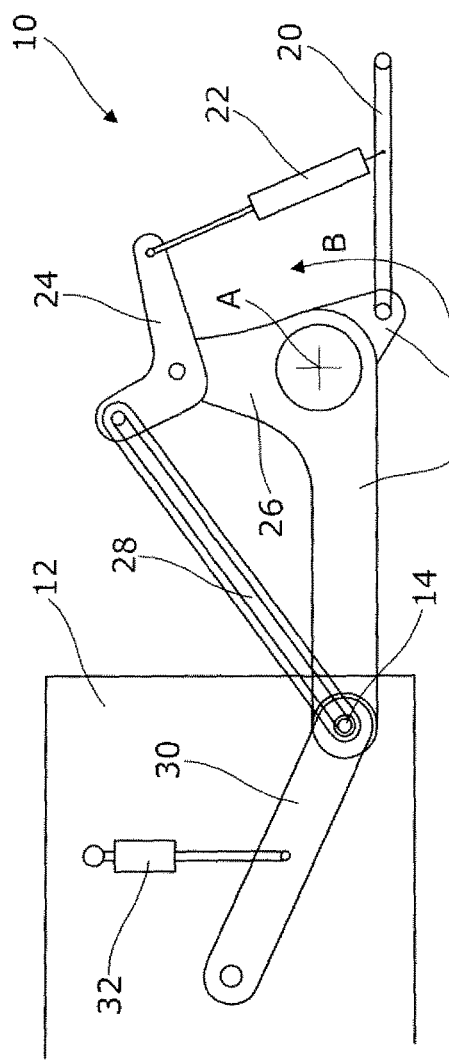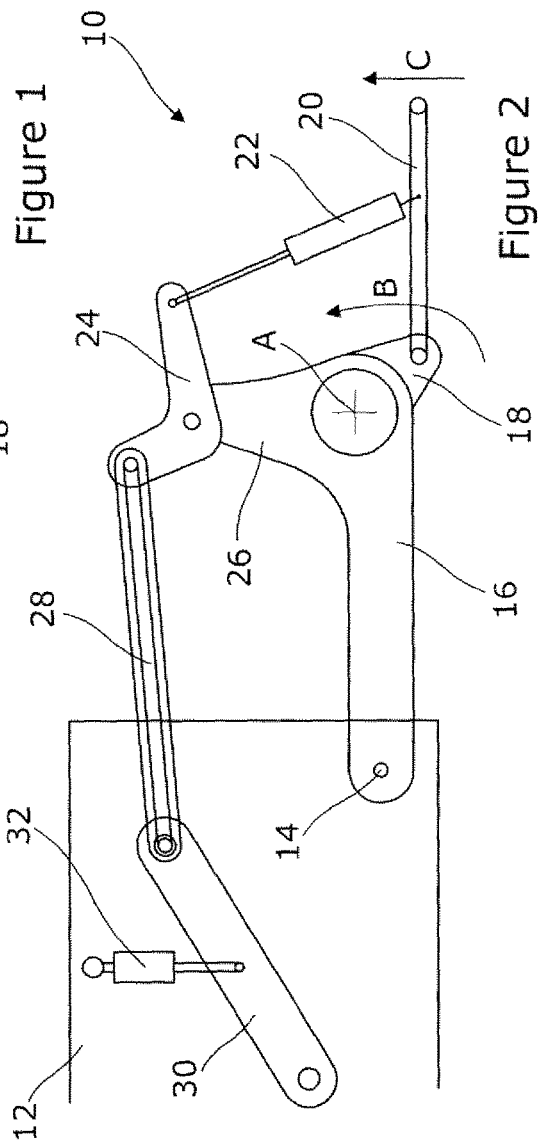

REAR LINK CONTROL

BACKGROUND OF THE INVENTION

Field of Invention

The present invention relates to tractor rear links and in particular, but not exclusively, to an independent rear suspension mechanism for isolating the rear link.

Description of Related Art

Tractors are provided with a top link and lower links in order to carry implements such as ploughs and hay tools which need supporting rather than simply towing. Most link-supported implements work best when the links follow closely the profile of the soil. In a tractor with no rear suspension the links will naturally follow the line of the soil as the connection between the tyre and the plough is rigid (subject to the elasticity of the tyre).

In a tractor with a suspended rear axle this is not the case as the suspension between the chassis and the wheel breaks the rigid link between profile of the soil and the link position. As a result, with the lower link mounted on the suspended rear axle the link can rotate with the rear axle leading to the implement being less than ideally located with respect to the soil surface.

It is an objective of the present invention to at least mitigate one or more of the above problems.

OVERVIEW OF THE INVENTION

According to the invention there is provided a suspended axle for a tractor, the axle having a lower link mechanism selectively operable between a first configuration in which the lower links are in fixed relation to the suspended axle and a second configuration in which the lower links are isolated from the suspended axle.

Advantageously, this allows the operator to select the most appropriate configuration for the conditions. For example the lower links can be isolated from the suspended axle for field work and move with the rear axle for road work.

Preferably, the suspended axle is pivoted on the tractor chassis. The suspended axle may be provided as a retrofit solution which is adapted to be pivotable on a tractor chassis.

Preferably, the suspended axle has a rear axle arm which carries a lift arm lever pivotally attached to an upper end of a lift arm.

Preferably, a lower end of the lift arm is connected to the lower links.

Preferably, the mechanism is selectively operable by actuation of a link connected to the lift arm lever between a first position in which a first end of the link coincides with the suspended axle pivot and a second position in which the first end of the link is distal from the suspended axle pivot.

In one aspect, the mechanism is arranged such that there is no direct physical connection between the first end of the link and the suspended axle pivot, when the first end of the link is in the first position. In an alternative aspect, the mechanism may be arranged such that a physical connection can be made between the first end of the link and the suspended axle pivot when the first end of the link is in the first position, e.g. through use of a suitable locking pin or arm or other device arranged between the first end of the link and the suspended axle pivot, when the first end of the link is in the first position.

Preferably, the link is actuable by a first end of an isolation arm.

Preferably, a second end of the isolation arm is pivoted on the tractor chassis and is actuable by a hydraulic actuator.

The hydraulic actuator may be coupled with a hydraulic system provided on a tractor.

BRIEF DESCRIPTION OF THE DRAWINGS

The invention will now be described, by way of example only, and with reference to the following drawings, in which:

FIG. 1 is a schematic side view of the suspended axle of the present invention shown in a first position;

FIG. 2 is a schematic side view of the suspended axle of FIG. 1 shown in a second position.

DETAILED DESCRIPTION OF THE INVENTION

Figure 3:
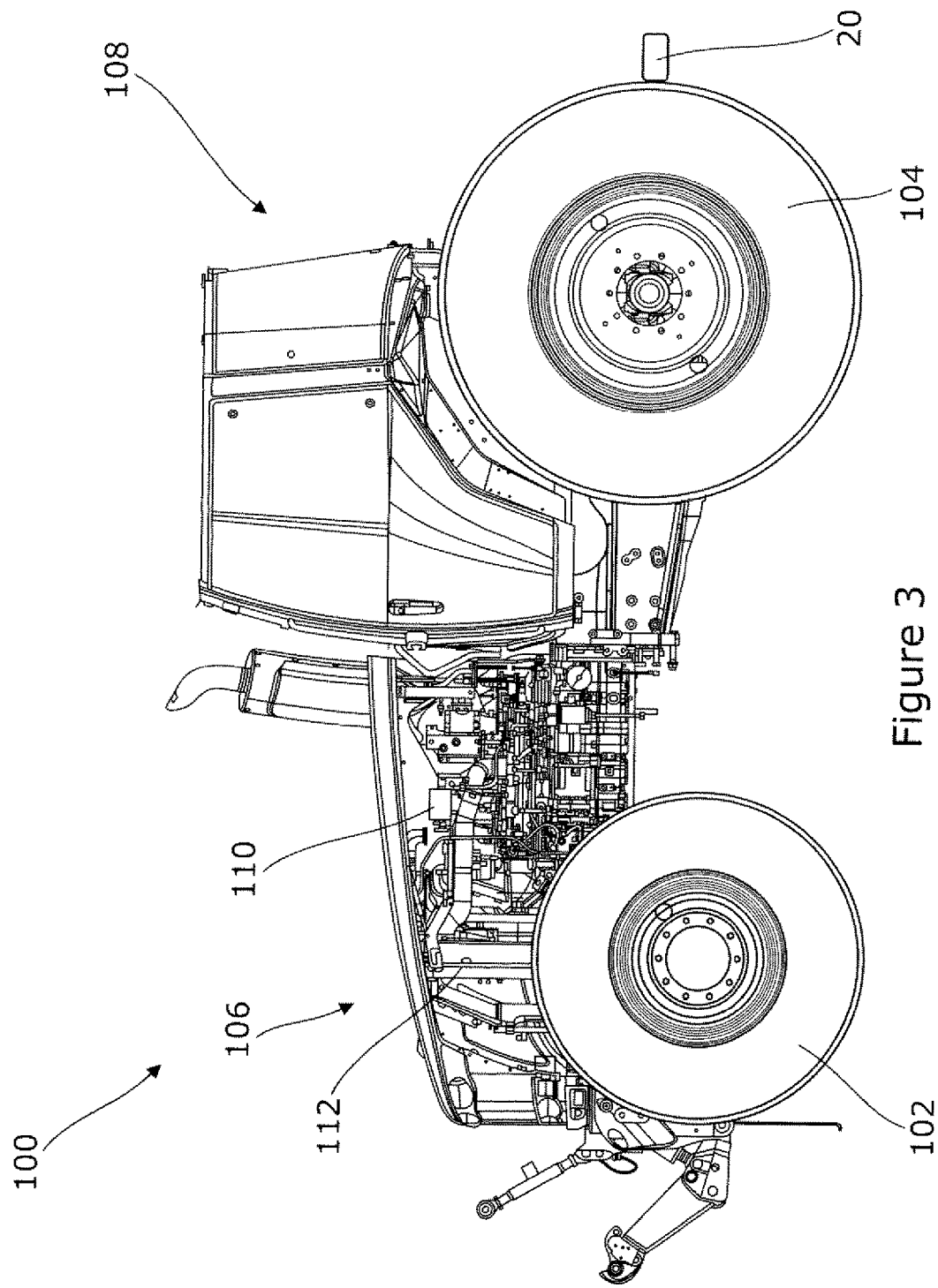
FIG. 3 is a side view of an agricultural tractor having a suspended axle according to the invention.

FIGS. 1 and 2 show a suspended rear axle 10 for a tractor with full independent suspension. The rear axle 10 is pivoted on the tractor chassis indicated generally at 12 at pivot 14. The rear axle arm 16 carries a rear differential centred at point A. At the rear end of the rear axle arm 16 is a flange 18 that supports rear links 20. The opposite end of the rear links 20 are supported by rear lift arms 22 the upper end of which is attached to a lift arm lever 24 which is pivoted on an upper extension 26 of the rear axle arm 16. The opposite end of the lift arm lever 24 is connected to a link 28 which is moveable under the action of an isolation arm 30. The isolation arm 30 is actuated by an actuator 32 between its first position shown in FIG. 1 and its second position shown in FIG. 2.

In FIG. 1, rotation of the rear axle arm 16 in an upward direction in response to changing terrain along arc B causes a consequential rotation of the rear link 20 along the same arc since the connection between the isolation arm 30 and link 28 is coincidental with the rear axle arm pivot 14.

In contrast, in FIG. 2, rotation of the rear axle arm 16 in an upward direction along the same arc B does not lead to the same displacement of the rear link due to the establishment of a four bar linkage resulting from the movement of the link 28 to its new position. In this configuration the rear link is caused to move in an upward direction C. This direction C more closely matches the profile of the terrain (ie an upward deflection) than does the movement of the rear link in the first configuration shown in FIG. 1.

This allows the rear link, and, as a result the implement being carried on the rear linkage, to more closely match the terrain. This allows the tractor to match the rear link operation to the nature of the work being undertaken, in particular matching the requirements of the implement during on-road and on-field conditions.

An agricultural tractor 100 is illustrated in FIG. 3. The tractor 100 comprises front wheels 102, rear wheels 104, an engine section 106 and a cab section 108. The engine section 106 comprises a tractor engine 110 and an engine cooling system 112 located adjacent thereto. The rear link 20 of FIGS. 1 and 2 is provided towards the rear of the tractor 100. The tractor 100 may comprise a chassis or frame to which components may be attached or mounted.

In one aspect, the suspended axle mechanism shown in FIGS. 1 and 2 is provided as a component of a tractor 100. In an alternative aspect, the suspended axle mechanism may be provided as a retrofit solution for an existing tractor 100.

The invention is not limited to the embodiment described herein, and may be modified or adapted without departing from the scope of the present invention.

The invention claimed is:

1. A suspended axle for a tractor, the suspended axle configured to pivot on a chassis of the tractor about a suspended axle pivot, the axle comprising:
   a lower link mechanism selectively operable between a first configuration in which lower links of the lower link mechanism are in fixed relation to the suspended axle and a second configuration in which the lower links are isolated from the suspended axle, wherein the lower link mechanism is selectively operable by actuation of a link connected to a lift arm lever between a first position in which a first end of the link coincides with the suspended axle pivot and a second position in which the first end of the link is distal from the suspended axle pivot.

2. The suspended axle of claim 1 wherein the suspended axle has a rear axle arm which carries the lift arm lever pivotally attached to an upper end of a lift arm.

3. The suspended axle of claim 2 wherein a lower end of the lift arm is connected to the lower links.

4. The suspended axle of claim 1 wherein the link is actuable by a first end of an isolation arm.

5. The suspended axle of claim 4 wherein a second end of the isolation arm is pivoted on the tractor chassis and is actuable by a hydraulic actuator.

6. An agricultural tractor comprising a suspended axle as claimed in claim 1.

\* \* \* \* \*